United States Patent [19]

White et al.

[11] 4,324,884

[45] Apr. 13, 1982

[54] ORGANIC AMINE CATALYZED METHOD FOR MAKING POLYETHERIMIDE

[75] Inventors: Dwain M. White, Schenectady, N.Y.; David G. Keyes, Minneapolis, Minn.

[73] Assignee: General Electric Company, Schenectady, N.Y.

[21] Appl. No.: 190,613

[22] Filed: Sep. 25, 1980

[51] Int. Cl.$^3$ ............................................. C08G 73/10
[52] U.S. Cl. .................................................... 528/207
[58] Field of Search ........................... 528/21, 173–207

[56] References Cited

U.S. PATENT DOCUMENTS

| | | | |
|---|---|---|---|
| 3,847,870 | 11/1974 | Takekoshi | 528/14 |
| 3,850,885 | 11/1974 | Takekoshi et al. | 528/14 |
| 3,998,840 | 12/1976 | Williams et al. | 528/14 |
| 4,169,932 | 10/1979 | Sokolov et al. | 528/207 |

OTHER PUBLICATIONS

4–Dialkylaminopyridines as Highly Active Acylation Catalysts, Hofle et al., Angew. Chem. Int. Ed. Engl. 17, 569–583 (1978).
Structural Effects on the Rates of Formation of Amic Acids and Imides, Dror et al., J. Chem. Soc., Perkin II, 1425 (1974).
NASA Tech Brief, PB80-972160, ARC-11107, Improved Imide Polymerization Catalyst.
A Study of Base–Catalyzed and Salt-Catalyzed Acetylation of Hydroxyl Groups, Schenk et al., Anal. Chem., 34, 914–919, (1964).
Preparation of Acyclic Imides, Hurd et al., J. of Org. Chem., vol. 24, pp. 388–392 (1959).
Cyclization of Aromatic Polyamido Acids to Polyimides, Lavrov et al., Chemical Abstracts, vol. 87 (1977), p. 4.
A Case History of Transmuting an Idea into Money, M. Orchin., J. of Chem. Education, p. 782.
The Preparation of Phthalamic Acids and their Conversion into Anthranilic Acids, Chapman et al., J. Chem. Soc. 127, 1791 (1925).

*Primary Examiner*—Maurice J. Welsh
*Attorney, Agent, or Firm*—William A. Teoli; James C. Davis, Jr.

[57] ABSTRACT

A method is provided for making polyetherimides, based on the use of certain organic diamine catalysts, for example, 4-dimethylaminopyridine and secondary or tertiary aliphatic diamines, to accelerate the intercondensation of aromatic bis(ether anhydride) and organic diamine under solution or melt polymerization conditions. The resulting polyetherimides are high performance injection moldable thermoplastics.

15 Claims, No Drawings

ORGANIC AMINE CATALYZED METHOD FOR MAKING POLYETHERIMIDE

Reference is made to our copending applications Ser. No. 118,756, filed Sept. 19, 1980, A Method for Making Polyetherimides, Ser. No. 118,754, filed Sept. 19, 1980, Method for Making Polyetherimides and Ser. No. 190,594, filed Sept. 25, 1980, Quaternary Ammonium Salt Catalyzed Method for Making Polyetherimides and Takekoshi appliciation Ser. No. 118,755, filed Sept. 19, 1980, A Method for Making Polyimides, assigned to the same assignee as the present invention.

BACKGROUND OF THE INVENTION

The present invention relates to a method for making polyetherimides by effecting reaction between an aromatic bis(ether anhydride) and an organic diamine under melt or solution polymerization conditions. More particularly, the present invention relates to the use of certain organic diamine as polymerization catalysts for making aromatic polyetherimides.

Prior to the present invention, certan catalysts, such as sodium chloride and ferrric sulfate, as shown by Williams et al., U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less effective or not effective when utilized for making polyetherimides from aromatic bis(ether anhydride) and organic diamine under solution polymerization conditions. In addition, the presence of chloride ion may interfere with the use of such polyetherimide in electrical applications. Various metal compounds were also use to catalyze polyetherimide formation by imide-amine exchange reactions, as shown by U.S. Pat. No. 3,847,870, Takekoshi and U.S. Pat. No. 3,850,885, Takekoshi et al., assigned to the same assignee as the present invention. However, the nature of the polymerization is quite different from polyetherimide formation by the melt polymerization of aromatic bis(ether anhydride) and organic diamine, which is amine-anhydride interaction rather than imide-amine exchange.

STATEMENT OF THE INVENTION

The present invention is based on the discovery that certain heterocyclic organic diamines, varius aliphatic secondary and tertiary diamines, and certain secondary and tertiary monoamines, for example 4-dimethylaminopyridine, dibutylethylenediamine, dibutyl amine, etc., can enhance the rate of formation of such aromatic polyetherimide resulting from aromatic bis(ether anhydride) and organic diamine interaction under melt polymerization or solution polymerization conditions when such amine catalysts are utilized in an effective amount in the polymerization mixture.

There is provided by the present invention, a method for making aromatic polyetherimide which comprises, (1) effecting reaction between a $C_{(6-30)}$ aromatic bis(ether anhydride) and a $C_{(2-20)}$ aromatic diamine in the presence of an effective amount of an organic amine catalyst selected from the class consisting of aliphatic aminopyridines, aliphatic secondary diamines, aliphatic tertiary diamines, $C_{(8-20)}$ organic secondary monoamines and $C_{(8-20)}$ organic tertiary monoamines, and (2) recovering the aromatic polyetherimide from the mixture of (1).

Among the aromatic organic dianhydrides which can be utilized in the practice of the invention are aromatic bis(ether anhydride)s of the formula,

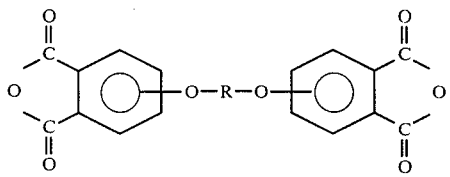

where R is a divalent aromatic organic radical having from 6-30 carbon atoms. In addition to the aromatic bis(ether anhydride)s of formula (1) there also can be used other aromatic bisanhydrides, for example,

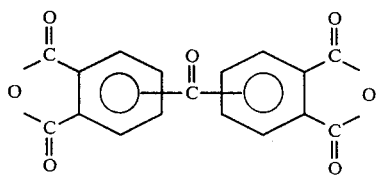

Organic diamines which can be utilized in the practice of the invention are included by the following formula, $$H_2NH^1NH_2, \qquad (2)$$

where $R^1$ is a divalent organic radical selected from R radicals, alkylene radicals having from 2-20 carbon radicals, cyclo alkylene radicals and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthalene, etc., and radicals included by the formula,

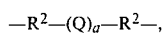

where $R^2$ is a divalent aromatic radical having 6-13 carbon atoms selected from hydrocarbon radicals and halogenated hydrocarbon radicals, and Q is a divalent organo radical selected from

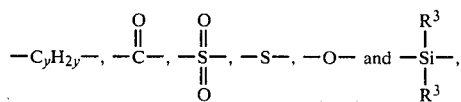

where a is 0 or 1, y is an integer having a value of from 1-5 inclusive, and $R^3$ is a monovalent hydrocarbon radical selected from methyl, phenyl, etc.

Radicals included by $R^1$ are, for example,

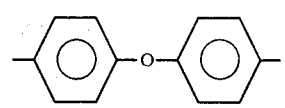

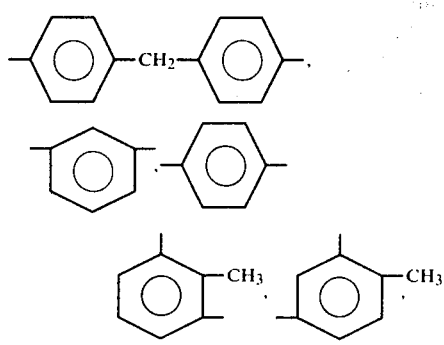

etc.; alkylene radicals such as hexamethylene, etc., cyclohexylene,

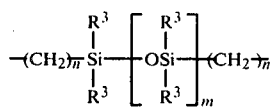

where $R^3$ is as defined above, m is equal to 0 to 100 inclusive and n is 2–8 inclusive.

Included by the aromatic bis(ether anhydride) of formula (1) which can be used in the practice of the present invention are, for example,

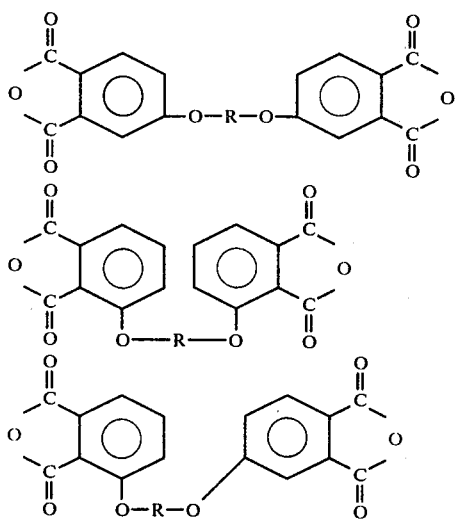

where R is as defined above.

Dianhydrides included by formula (4) are, for example, 2,2-bis[4-(2,3-dicarboxyphenoxy)phenyl]propane dianhydride 4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenylsulfide dianhydride;

1,4-bis(2,3-dicarboxyphenoxy)benzene dianhydride;

4,4'-bis(2,3-dicarboxyphenoxy)diphenylsulfone dianhydride; etc.

Dianhydrides included by formulas (3) and (5) are, for example, 2,2-bis[4-(3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4dicarboxyphenoxy)diphenylsulfone dianhydride;

4-(2,3-dicarboxyphenoxy)-4'-(3,4-dicarboxyphenoxy)-2,2-diphenylpropane dianhydride, etc.

Included by the organic diamines of formula (2) are, for example, m-phenylenediamine;
p-phenylenediamine;
4,4'-diaminodiphenylpropane;
4,4-diaminodiphenylmethane;
benzidine;
4,4'-diaminodiphenylsulfide;
4,4'-diaminodiphenylsulfone;
4,4'-diaminodiphenyl ether;
1,5-diaminonapthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Organic amine catalysts which have been found to be effective in the practice of the method of the present invention are, for example, 4-dimethylaminopyridine (DMAP), 4-pyrrolidinopyridine (PPY), diazobicyclooctane (DABCO), etc. In addition, a variety of aliphatic secondary and tertiary diamines included within the structural formula,

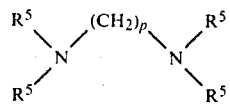

are also operable, where p is an integer having a value of 2-4 inclusive, $R^5$ is selected from $C_{(1-10)}$ alkyl radicals and $C_{(2-10)}$ alkyl amino radicals and $R_6$ is selected from hydrogen and $R_5$ radicals. Some of the secondary diamines which are operable are, for example,

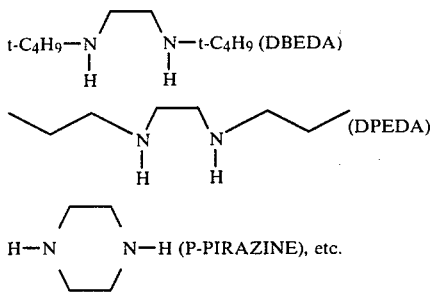

Among the tertiary 1,2-diamines, there are included

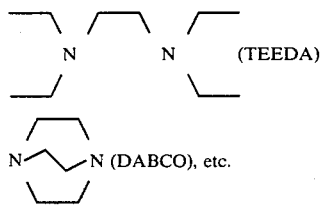

Additional organic diamines are secondary 1,3-diamines

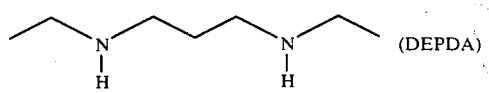

tertiary 1,3-diamines,

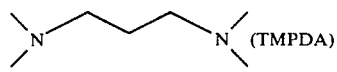

tertiary 1,4-diamines,

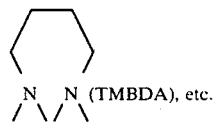

In addition to the above organic diamines, certain nonvolatile $C_{(8-20)}$ secondary and tertiary organic monoamines can be used, such as, tripropyl amine, tributyl amine, dibutylamine, etc.

In the practice of the present invention, reaction can be effected between the organic dianhydride and the organic diamine in the presence of the organic amine which hereinafter will represent the aforedescribed aminopyridines, aliphatic tertiary amines and aliphatic secondary amines, also referred to hereinafter as the "amine catalyst" under solution polymerization conditions at a temperature in the range of from 130° C. to 300° C. or under melt polymerization conditions at a temperature of from 250° C. to 350° C.

In instances where solution polymerization is practiced, there can be utilized various organic solvents, for example,
chlorobenzene;
o-dichlorobenzene;
m-dichlorobenzene;
1,2,4,-trichlorobenzene;
4-chlorotoluene;
bromobenzene;
biphenyl;
phenyl ether, etc.

It has been found that a proportion of from about 0.9 to 1.1 moles of organic diamine, per mole of organic dianhydride can be used, while substantially equal molar amounts of such reactants along with appropriate quantities of chain-stoppers, such as aniline or phthalic anhydride, are preferred. The solids concentration of at least 10% by weight to 50% by weight during solution polymerization has been found to be effective.

The amine catalyst can be used at concentrations of from 0.005 to 5% by weight, based on the weight of total solids in the polymerization mixture, and will vary within this range, depending upon the particular structure of the amine used. For example, aminopyridines and diazobicyclooctane (DABCO) can be used effectively in the range of 0.005-5%, and preferably 0.01 to 2, while secondary diamines, such as DBEDA can be used at from 0.005-0.1% and preferably 0.01-0.05%. Tertiary diamines can be used at from 0.02 to 5% and preferably 0.3 to 3% by weight while the aforedescribed secondary monoamines can be used at from 0.05 to 2% and preferably from 0.1% to 1% and the tertiary monoamines can be used at from 0.1% to 5% and preferably from 0.5% to 3%, based on the weight of the total solids. Reaction times can vary widely depending upon the particular aromatic organic dianhydride and organic diamine utilized, as well as the temperature of the reaction. However, an enhancement of the rate of reaction will be effected and readily discernable as the result of the use of the amine catalyst.

In instances where melt polymerization is employed, substantially similar proportions of reactants and catalysts as described above for solution polymerization can be utilized in the absence of organic solvent. Melt polymerization can be achieved satisfactorily in a melt extruder, as taught, for example, by Mellinger et al., U.S. Pat. No. 4,073,773.

The polyetherimides made in accordance with the practice of the present invention can be employed as high performance injection moldable thermoplastics. Depending upon the nature of the organic dianhydride and the organic diamine utilized, the resulting polyimides also can be utilized in a variety of other applications, for example, insulation, films, wire coatings, glass and graphite fiber composites, laminates, etc.

In order that those skilled in the art will be better able to practice the invention, the following examples are given by way of illustration and not by way of limitation. All parts are by weight.

EXAMPLE 1

A mixture of 163 parts of o-dichlorobenzene, 67.66 parts of 2,2-bis[4-(3,4-dicarboxyphenoxy)phenyl]propane dianhydride, 13.64 parts of meta-phenylenediamine, 0.712 part of aniline and 0.16 part of 4-dimethylaminopyridine was stirred under a nitrogen atmosphere and heated with an oil bath at a temperature of 145° C. The oil bath temperature was raised over a 60 minute period to 195° C. Reaction of the aforementioned ingredients resulted in the evolution of water and after a 60 minute period the o-dichlorobenzene began to reflux. During the course of the reaction, samples were taken in 1 hour, 2 hour, 4 hour and 6 hour heating periods.

A portion of each sample was then diluted with chloroform for GPC analysis. The remainder of each sample was diluted with chloroform and precipitated from solution by the solution to a 10 fold volume of methanol, followed by filtration, washing the precipitate and drying. The intrinsic viscosity of the resulting product was then taken in chloroform at a temperature of 25° C.

The above procedure was repeated with additional amine catalyst including acyclic trialkyl amines to determine the effectiveness of these materials. The results are shown in the following table, where DMAP is 4-dimethylaminopyridine, PPY is 4-pyrrolidonepyridine, DABCO is diazobicyclooctane, $Et_3N$ is triethylamine, $Pr_3N$ is tripropylamine, $Bu_3N$ is tributylamine, $Bu_2NH$ is a dibutylamine and WT% is based on anticipated weight of polymer:

| Catalyst | | GPC Value for $\overline{M}w$ ($\times 10^{-3}$)$^a$ at time | | | | IV at Time | |
|---|---|---|---|---|---|---|---|
| Compound | WT % | 1 hr | 2 hr | 4 hr | 6 hr | 1 hr | 6 hr |
| None | — | 10 | 14 | 20 | 23 | 0.24 | 0.35 |
| DMAP | 1.0 | 22 | 28 | 29 | 31$^b$ | .36 | 0.46 |
| " | 0.5 | 18 | 25 | 26 | 25 | .34 | .43 |
| " | .2 | 21 | 23 | 26 | 28 | .41 | .49 |
| " | .1 | 22 | 25 | 28 | 28 | .35 | .45 |
| " | .05 | 21 | 23 | 26 | 27 | .35 | .42 |
| " | .028 | 15 | 18 | 20 | 22 | .30 | .41 |
| " | .012 | 14 | 16 | 18 | 20 | .29 | .39 |
| PPY | 1.0 | 25 | 28 | 28 | 28 | .43 | .47 |
| DABCO | 1.0 | 26 | | 28 | 30 | .45 | .49 |
| " | 0.2 | 22 | 25 | 27 | 29 | .39 | .48 |
| " | .1 | 22 | 26 | 26 | 29 | .37 | .47 |
| " | .05 | 19 | 24 | 28 | 29 | .35 | .45 |
| " | .028 | 16 | 20 | 28 | 26 | .33 | .44 |
| " | .014 | 13 | 23 | 25 | 27 | .34 | .38$^c$ |
| $Et_3N$ | 2.0 | 17 | 20 | 22 | — | .35 | .41 |
| $Pr_3N$ | 1.0 | 19 | 22 | 25 | 26 | .36 | .42 |
| $Bu_3N$ | 1.0 | 19 | 23 | 25 | 26 | .35 | .42$^d$ |
| $Bu_2NH$ | 1.0 | 22 | 25 | 27 | 28 | .41 | .46 |
| " | 0.1 | 19 | 20 | 24 | 26 | .33 | .43 |
| " | .05 | 20 | 22 | 25 | 26 | .32 | .40 |

$^a\overline{M}w$ based on polystyrene calibration, corrected to polyetherimide.
$^b$5 hr. point
$^c$24 hr. point
$^d$4 hr. point

EXAMPLE 2

The procedure in Example 1 was repeated with an additional series of aliphatic diamines to provide the following results:

| Catalyst | | GPC Value for $\overline{M}w$ ($\times 10^{-3}$)$^a$ at time | | | | [η] | |
|---|---|---|---|---|---|---|---|
| Compound | WT % | 1 hr | 2 hr | 4 hr | 6 hr | 1 hr | 6 hr |
| None | 0% | 10 | 14 | 20 | 23 | 0.24 | 0.35 |
| DBEDA | 1.0 | 20 | 25 | 28 | 32 | .40 | .49 |
| " | 0.1 | 21 | 25 | 27 | 29 | .38 | .45 |
| " | .05 | 22 | 25 | 27 | 29 | .35 | .48 |
| " | .025 | 22 | 26 | 28 | 29 | .36 | .46 |
| " | .0125 | 19 | 23 | 24 | 31 | .31 | .48 |
| DPEDA | 1.0 | 30 | 33 | 29 | 75$^c$ | .33 | .34 |
| " | 0.1 | 36 | 37 | 37 | 64$^c$ | .45 | .45 |
| " | .05 | 26 | 31 | 32 | 34 | .42 | .50 |
| " | .025 | 20 | 23 | 28 | 29 | .38 | .46$^d$ |
| Piperazine | 0.1 | 30 | 35 | 40 | 41 | .46 | .56 |
| " | .05 | 22 | 28 | 31 | 27 | .37 | .47 |
| " | .025 | 18 | 21 | 24 | 26 | .35 | .45 |
| " | .0125 | 19 | 20 | 23 | 23 | .30 | .38 |
| TEEDA | 1.0 | 26 | 29 | 34 | 35 | .37 | .52 |
| " | .1 | 16 | 18 | 22 | 23 | .34 | .43 |
| " | .05 | 16 | 17 | 19 | 21 | .30 | .40 |
| DEPDA | 1.0 | $c$ | $c$ | $c$ | $c$ | .43 | .45 |
| " | .1 | $c$ | $c$ | $c$ | $c$ | .45 | .47 |
| " | .05 | 36$^c$ | 41$^c$ | 41$^c$ | 41$^c$ | .44 | .46 |
| " | .025 | 28 | 35 | 38 | 38 | .42 | .40 |
| " | .0125 | 20 | 25 | 29 | 30 | .37 | .45 |
| TMPDA | 1.0 | 25 | 28 | 29 | 30 | .39 | .46 |
| " | .05 | 23 | 25 | 27 | 26 | .35 | .40 |
| " | .025 | 20 | 22 | 25 | 28 | .32 | .40 |
| TMBDA | 1.0 | 25 | 26 | 28 | 29 | .42 | .44 |
| " | .1 | 21 | 25 | 26 | 27 | .38 | .42 |
| " | .05 | 17 | 19 | 22 | 25 | .33 | .41 |
| " | .025 | 19 | 22 | 24 | 25 | .33 | .39 |

$^a\overline{M}w$ from GPC using PS calibration, corrected to polyetherimide a Q factor of 0.60
$^b$[η] after 4 hrs. reaction time.
$^c$An overlapping excluded peak prevents accurate $\overline{M}w$ measurement.

EXAMPLE 3

A mixture of 65.6 parts dianhydride, 14.06 parts m-phenylene diamine and 1.155 parts phthalic anhydride was dry-blended in a Waring blender. Mixtures of the blend (10 parts) and 0.02 part of amine catalyst were blended and then heated in open glass tubes in a preheated aluminum block at 255±2° C. for 9 minutes. The polymeric products were dissolved in chloroform to form a 5% solution and precipitated with 5 volume of methanol. The washed and dried polymer were analyzed by GPC. The following results were obtained:

| Amine Catalyst | WT % | $Mw$ ($\times 10^{-3}$)** |
|---|---|---|
| Control | 0 | 11 |
| DMAP | 0.2 | 19 |
| " | 0.2* | 19 |
| DBEDA | 0.2* | 24 |

*Added in $CHCl_3$ solution (10% conc.).
**Wt. average molecular weight based on PS calibration corrected to polyetherimide.

Although the above examples are directed to only a few of the very many variables within the scope of the method of the present invention, it should be understood that the present invention involves a much broader variety of organic dianhydrides as shown by formula (1), organic diamines as shown by formula (2) and amine catalysts of the present invention as illustrated in the description preceding these examples.

What we claim as new and desire to secure by Letters Patent of the United States is:

1. A method for making aromatic polyetherimide which comprises
   (1) effecting reaction between a $C_{(6-30)}$ aromatic bis(ether anhydride) of the formula,

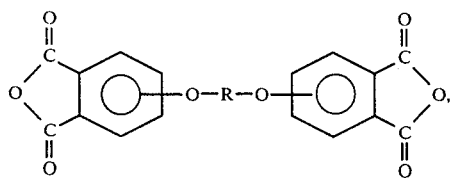

and a $C_{(3-20)}$ organic diamine of the formula, $H_2NR^1NH_2$, in the presence of an effective amount of an amine catalyst selected from the class consisting of N-aliphatic aminopyridines, aliphatic secondary diamines, aliphatic tertiary diamines, $C_{(8-20)}$ organic secondary monoamines and $C_{(8-20)}$ organic tertiary monoamines, and (2) recovering the aromatic polyetherimide from the mixture of (1), where R is a divalent aromatic organic radical having from 6-30 carbon atoms and $R^1$ is a divalent organic radical selected from R radicals, alkylene radicals having from 2-20 carbon radicals, cyclo alkylene radicals and $C_{(2-8)}$ alkylene terminated polydiorganosiloxane radicals.

2. A method in accordance with claim 1, where R is

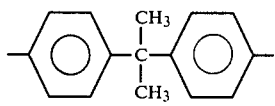

3. A method in accordance with claim 1, where $R^1$ is

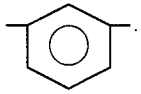

4. A method in accordance with claim 1, where the amine catalyst is an aminopyridine.

5. A method in accordance with claim 1, where the amine catalyst is an aliphatic secondary diamine.

6. A method in accordance with claim 1, where the amine catalyst is an aliphatic tertiary diamine.

7. A method in accordance with claim 1, where the amine catalyst is a $C_{(8-20)}$ organic secondary monoamine.

8. A method in accordance with claim 1, where the amine catalyst is a $C_{(8-20)}$ tertiary monoamine.

9. A method in accordance with claim 4, where the aminopyridine is 4-dimethylaminopyridine.

10. A method in accordance with claim 1, where the amine catalyst is diazobicyclooctane.

11. A method in accordance with claim 4, where the amine catalyst is 4-pyrrolidinopyridine.

12. A method in accordance with claim 1, where the amine catalyst is piperazine.

13. A method in accordance with claim 1, where the amine catalyst is dibutylamine.

14. A method in accordance with claim 1, where the reaction is conducted under solution polymerization conditions.

15. A method in accordance with claim 1, where the reaction is conducted under melt polymerization conditions.

* * * * *